Oct. 18, 1927.

R. T. HOSKING 1,645,859

LOCK WASHER FOR CAP SCREWS

Filed Nov. 8, 1926

INVENTOR
Richard T. Hosking
BY
George B. Willcox
ATTORNEY

Patented Oct. 18, 1927.

1,645,859

UNITED STATES PATENT OFFICE.

RICHARD T. HOSKING, OF WILMETTE, ILLINOIS, ASSIGNOR TO SHAKEPROOF LOCK WASHER COMPANY, INCORPORATED, DIVISION OF ILLINOIS TOOL WORKS, OF CHICAGO, ILLINOIS, A CORPORATION OF ILLINOIS.

LOCK WASHER FOR CAP SCREWS.

Application filed November 8, 1926. Serial No. 147,019.

This invention relates to washers for locking bolts and screws with round heads, commonly known as flat head or fillister head cap screws, and for similar work. The heads of such screws are cylindrical and are only slightly larger in diameter than the body, the shoulder at the base of the head being so narrow as to preclude the use of lock washers such as those shown in my Patent No. 1,419,564, issued June 13, 1922.

Lock washers of that type are generally of annular shape, formed with a central bolt opening and having prongs or teeth projecting radially, either outwardly or inwardly, the teeth being slightly twisted and of substantially the same width as thickness near their outer ends. The teeth exert locking effect to prevent unscrewing of the bolt by reason of the fact that the diagonal dimension of the tooth cross-section tends to be jammed as a strut between the work and the bolt head or nut and thereby acts as a prop or wedge tending to force them bodily apart, as explained in the above mentioned patent.

Such lock washers are effective when used on ordinary bolts that have shoulders wide enough to accommodate the width of the annular ring, that is, the width of the annular washer body plus the length of the radial teeth. But fillister head bolts and screws are made with extremely narrow shoulders at the base of the head, and if the teeth of such a washer are made sufficiently long to properly perform their locking functions the annular ring that carries the teeth must be very narrow. It then does not afford proper stiffness or support for the twisted teeth when the nut is screwed down tightly upon them.

It is an object of my present invention to provide a simple and inexpensive washer, operating, in so far as the teeth are concerned, in the same manner as set forth in the above mentioned patent, but adapted for locking the heads of bolts having narrow shoulders, or for any other similar class of work where adequate strength is required in the washer to hold its shape, but where the width of its annular ring must be restricted, or even where all resemblance of a ring must be dispensed with.

With the foregoing and certain other objects in view, which will appear later in the specifications, my invention comprises the devices described and claimed and the equivalents thereof.

In the drawings Fig. 1 is a side view of a fillister head bolt with my lock washer applied thereto, the washer being shown in section and the work shown diagrammatically.

Figure 1:
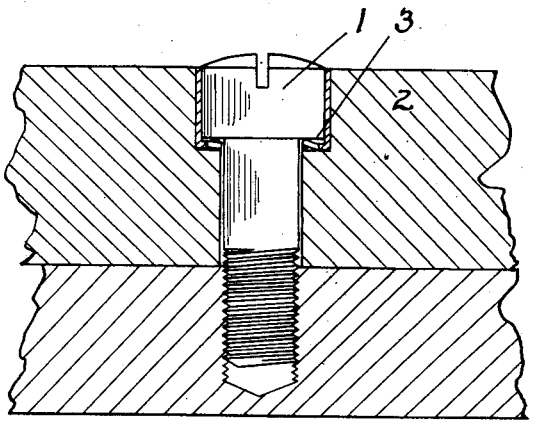

As is clearly shown in the drawings the fillister head 1 of a bolt is received in an aperture or recess formed in the work 2, as usual. The head of the bolt has a narrow shoulder 3, which, as above stated, is too narrow to take a lock washer of the type described in my previous patent.

A washer made according to the present invention is ferrule-like in form, that is, it comprises a cylindrical cup of sheet metal, its bottom formed with an opening to receive the body of the bolt and the metal of the bottom around the bolt opening formed with radially directed slits, the metal between the slits comprising radial internal teeth 4, which are twisted in the usual manner and heat-treated to provide the proper degree of resilience and hardness.

Figure 3:
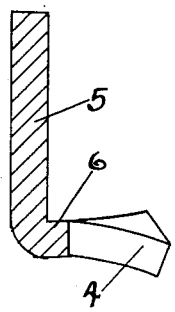
Fig. 3 is an enlarged radial cross section through a wall of the washer.
Figure 2:
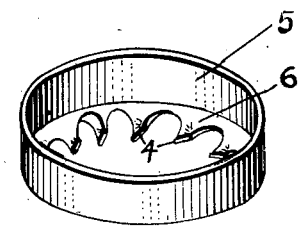
Fig. 2 is a perspective view of the washer.
Figure 4:
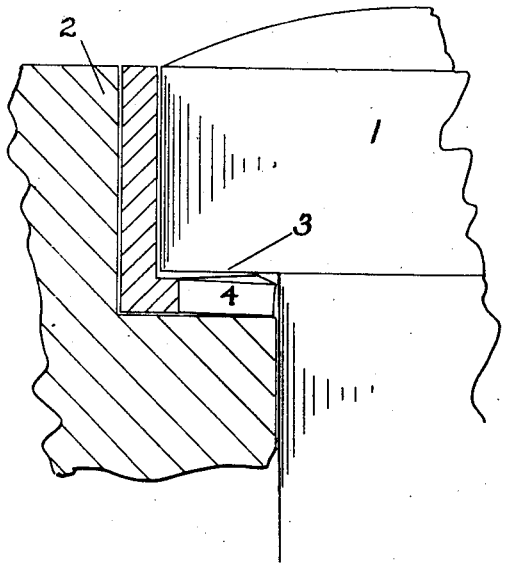
Fig. 4 is a further enlarged detail, showing the operation of the teeth in conjunction with the washer and work.

As is shown in Figs. 2 and 3, the root of the tooth 4 is close to the cylindrical wall 5, there being only a narrow annular strip of metal 6 between them.

This strip of metal is, in my invention an inwardly turned flange of the wall 5, the flange and the wall together forming a ferrule having inwardly projecting teeth 4.

Of itself the narrow annular ring 6 would not be strong enough, for the reasons above stated, to meet the requirements of practice, but when it is reinforced by the rim 5, which closely fits around bolt head 1, ample strength is provided for ring 6.

Figure 5:
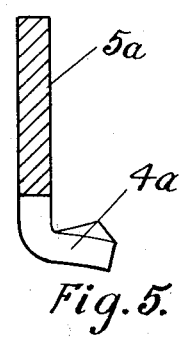
Fig. 5 is a section similar to Fig. 3, showing a modified structure.

If the shoulder is very narrow, so there is no space available for even a narrow ring 6, I employ the modified structure shown in Fig. 5, wherein the root of the tooth 4ª joins the wall 5ª directly, without a flanged ring.

Lock washers of the kind herein shown show no tendency to bend or tangle when they are handlded in bulk.

By the means above described a lock washer is provided that can be easily and conveniently applied to a bolt head having an extremely narrow shoulder.

Having thus described my invention, what I claim and desire to secure by Letters Patent is:

1. A lock washer comprising a cup having a cylindrical rim provided at its bottom with an internal flange, said flange formed with resilient teeth projecting radially inward, and twisted, for the purposes set forth.

2. A lock washer for a fillister head screw and the like comprising a cylindrical body, a narrow annular internal flange on an end of said body, inwardly directed twisted teeth on said flange, the width of said flange plus the length of the teeth being substantially equal to the width of the shoulder of the head of said screw, for the purposes set forth.

3. A lock washer for a fillister head screw and the like comprising a cylindrical body, an end of said body formed with inwardly directed twisted teeth, for the purposes set forth.

In testimony whereof, I affix my signature.

RICHARD T. HOSKING.